(12) United States Patent
Urata et al.

(10) Patent No.: US 7,755,745 B2
(45) Date of Patent: Jul. 13, 2010

(54) COHERENT DOPPLER LIDAR

(75) Inventors: Yoshiharu Urata, Saitama (JP); Satoshi Wada, Saitama (JP); Kohei Mizutani, Tokyo (JP)

(73) Assignees: Megaopto Co., Ltd., Saitama (JP); National Institute of Information and Communications Technology, Tokyo (JP)

( * ) Notice: Subject to any disclaimer, the term of this patent is extended or adjusted under 35 U.S.C. 154(b) by 205 days.

(21) Appl. No.: 12/164,880

(22) Filed: Jun. 30, 2008

(65) Prior Publication Data

US 2009/0073417 A1    Mar. 19, 2009

(51) Int. Cl.
*G01P 3/36* (2006.01)
(52) U.S. Cl. ...................... 356/28.5; 356/337
(58) Field of Classification Search ................ 356/28.5, 356/337, 342
See application file for complete search history.

(56) References Cited

U.S. PATENT DOCUMENTS

| | | | |
|---|---|---|---|
| 4,154,089 A * | 5/1979 | Carlon | 73/29.01 |
| 4,685,802 A * | 8/1987 | Saito et al. | 356/339 |
| 6,263,004 B1 * | 7/2001 | Arvidsson et al. | 372/11 |
| 6,973,115 B1 * | 12/2005 | Ferrand et al. | 372/92 |

\* cited by examiner

*Primary Examiner*—Isam Alsomiri
(74) *Attorney, Agent, or Firm*—Muncy, Geissler, Olds & Lowe, PLLC

(57) ABSTRACT

A coherent Doppler lidar which can oscillate high energy pulses and output laser beams in a longer wavelength range of 1.5 μm to the atmosphere is provided. The coherent Doppler lidar has a pulse laser an oscillation wavelength of which is controlled by means of injection locking of a seed light output from a master laser, wherein the pulse laser is a type in which a laser medium is disposed in a resonator, a pulse light of a predetermined repetition frequency is input to the laser medium as an excitation light, whereby pulse laser oscillation is generated in the resonator to output pulse laser beams from the resonator, and the laser medium being a type which has at least a region having Tm, Ho:YAG ceramics, and is excited by the excitation light to output pulse laser beams in 2 μm wavelength band.

10 Claims, 12 Drawing Sheets

CDL, VHF and Sonde observations at Wakkanai, Japan
2002-9-04 09LT

COHERENT DOPPLER LIDAR

BACKGROUND OF THE INVENTION

1. Field of the Invention

The present invention relates to a Coherent Doppler Lidar (CDL), and more particularly to a Coherent Doppler Lidar a laser light source of which to be loaded therewith is improved.

2. Description of the Related Art

Recently, demands for aviation security build up rapidly with increase of users in flights due to developments in aircraft.

Particularly, aircraft accidents due to air turbulence in fair weather are frequently reported in these days, so that a proactive measure of such aircraft accidents is an urgent problem.

In this respect, however, the air turbulence in fair weather is not only a phenomenon which cannot be visually recognized as a matter of course, but also a phenomenon which cannot be recognized by the use of radar. As a consequence, it is pointed out that the avoidance of the air turbulence in fair weather is difficult, even at the present days where computer-controlled aeronautical systems are made up.

Under the circumstances, engineering developments for remote sensing being a technology for observing an observation target by applying radio waves or lights from a remote place are strongly desired as a technology by which a sudden phenomenon such as air turbulence in fair weather is recognized in advance to avoid a possible accident derived therefrom. In this connection, a coherent Doppler lidar being a coherent Doppler sensor which may be designed compactly so as to be loaded with an aircraft is watched at present.

The coherent Doppler lidar will be described herein. First, both the LIDAR: (Light Detection And Ranging) and RADAR: (Radio Detection And Ranging) differ from one another in that the radar transmits radio waves, while the lidar uses laser beams in place of radio waves as a transmission light source.

The coherent Doppler lidar detects coherently signals, and measures frequencies of beat signals with respect to a local oscillator, whereby a Doppler shift of the frequencies due to an observation target is highly accurately detected.

In a coherent Doppler lidar loaded with an aircraft, targets reflecting laser beams are fine particles (aerosol) in the atmosphere and clouds.

Next, the principle of operations of the above-described coherent Doppler lidar will be described by referring to FIG. 1 of a constitutional, explanatory block diagram showing a conventional coherent Doppler lidar. In the coherent Doppler lidar, a seed light output from a master laser 10 is subjected to injection-locking, whereby an oscillation wavelength of the pulse laser 12 is controlled.

Pulse laser beams output from the pulse laser the oscillation wavelength of which is thus controlled are projected into the atmosphere through an input/output system 14 such as a telescope, and a scanner.

A reflected light which is derived from the one in accordance with such a manner that the pulse laser beams projected into the atmosphere as described above are subjected to Doppler shift in response to the behavior of aerosol is received through an input/output system 14, the reflected light is mixed with the laser beams from the master laser 10, and synthesized by a mixer 16a of a detection system 16.

Low frequency beat signals among the signal components synthesized by the mixer 16 are amplified by an IF amplifier 16b, the amplified signals are analog/digital-converted in an A/D converter 16c, and the resulting converted signals are stored in a computer 16d as digital signals.

In the computer 16d, a Doppler shift is determined by means of frequency analysis and is converted to a wind speed after removing an offset component from the Doppler shift, and the results obtained are displayed on a display 16e or stored in a storage device 16f such as a HDD or a digital tape.

In order to easily understand the operations of the coherent Doppler lidar, although an explanation is omitted in the above description, there is also in an actual measurement such a procedure that a part of the output from the pulse laser 12 is mixed with the output of the master laser 10 to monitor offsets of the output laser as reference signals in every pulses.

Incidentally, a coherent Doppler lidar functions to emit pulse laser beams into the atmosphere as described above. In this connection, it is desired to use such pulse laser oscillating in a region of a wavelength longer than 1.5 μm being a so-called eye safe region which is highly safe with respect to human eyes with taking the emission of pulse laser beams into the atmosphere in remote sensing into consideration.

Thus, developments of such coherent Doppler lidar which can oscillate high-energy pulses, and output laser beams in a region of a wavelength longer than 1.5 μm into the atmosphere are strongly desired.

OBJECT AND SUMMARY OF THE INVENTION

The present invention has been made in view of the above-described demand, and an object of the invention is to provide a coherent Doppler lidar which can oscillate high-energy pulses, and output laser beams in a region of a wavelength longer than 1.5 μm into the atmosphere.

In order to achieve the above-described object, a pulse laser being a constituent of the coherent Doppler lidar according to the present invention uses, as a laser medium, a material prepared by adding (hereinafter referred appropriately to "doping") at least either of Tm and Ho, as laser active ions, to clear YAG ceramics having a garnet structure and represented by a chemical formula $Y_3Al_5O_{12}$ (hereinafter referred to as "Tm, Ho:YAG ceramics" in the specification).

Furthermore, the pulse laser being the constituent of the coherent Doppler lidar according to the invention is excited with an excitation light in a wavelength band of a wavelength of 750 nm to 820 nm to be laser-oscillated.

In the coherent Doppler lidar, the YAG ceramics are a solid laser made of a polycrystalline substance by aggregating single crystals having a size of 1 mm or less.

With respect to an addition concentration (doping ratio) of Tm ions to be added to the YAG ceramics;

It is preferred that $0 \leq Tm \leq 20\%$ (where Tm=0, and Ho=0 are excluded), and moreover, with respect to an addition concentration (doping ratio) of Ho ions to be added to the YAG ceramics;

It is preferred that $0 \leq Ho \leq 10\%$ (where Tm=0, and Ho=0 are excluded).

In the coherent Doppler lidar, the Tm, Ho:YAG ceramics being YAG ceramics doped with at least either of Tm and Ho, i.e. the Tm, Ho:YAG ceramics being a solid laser made of a polycrystalline substance wherein at least either of Tm and Ho is used as an ion to be doped is oscillated with Ho ions, while Tm ions act as a sensitizer for allowing an excitation light to absorb effectively wherein an excitation light in a wavelength band of a wavelength of 750 nm to 820 nm is excited, whereby high-energy pulse laser beams in 2 μm wavelength band, and more specifically in 1.9 μm to 2.2 μm wavelength band are oscillated.

With the proviso that oscillation is made by Tm ions in case of Ho=0%; and Tm becomes active ions in case of Ho=0%. In this case, $^3H_4$ is in a laser upper level in FIG. 5, and a distribution accumulated to this level transits to $^3H_6$ being a lower level, whereby oscillation in 1.9 μm to 2.1 μm band arises.

Namely, according to the present invention, a coherent Doppler lidar may comprise a pulse laser an oscillation wavelength of which is controlled by means of injection locking of a seed light output from a master laser; pulse laser beams output from the pulse laser being injected to the atmosphere; and the pulse laser beams receiving a reflected light being the pulse laser beams injected to the atmosphere which are subjected to Doppler shift to detect the Doppler shift based on the reflected light received, wherein the pulse laser is a type in which a laser medium is disposed in a resonator, a pulse light of a predetermined repetition frequency is input to the laser medium as an excitation light, whereby pulse laser oscillation is generated in the resonator to output pulse laser beams from the resonator; the laser medium being a type which has a garnet structure and at least a region having Tm, Ho:YAG ceramics being a material which is prepared by adding at least either of Tm (thulium) and Ho (holmium) as laser active ions to clear YAG (yttrium, aluminum, and garnet) ceramics represented by a chemical formula $Y_3Al_5O_{12}$; the laser medium being excited by the excitation light to output pulse laser beams in a band of a wavelength of 1.9 μm to 2.2 μm; and further, the YAG ceramics are a solid laser made from a polycrystalline substance obtained by aggregating single crystals a size of which is 1 mm or less and; a cooling means for cooling the laser medium is provided.

In the coherent Doppler lidar of the invention, an addition concentration of Tm to be added to the YAG ceramics may be: 0≦Tm≦20% and 0≦Ho≦10% (where the case that both of Tm and Ho equal to 0 are excluded).

The laser medium may be in a rod-shaped body in which a region of the Tm, Ho:YAG ceramics is disposed in the central part along the axial direction of the rod-shaped body, and regions of the YAG ceramics to which no laser active ion is added are disposed in the opposite sides of the central part of the rod-shaped body.

In the coherent Doppler lidar of the invention, a wavelength band of the excitation light may be that of a wavelength of 750 nm to 820 nm.

The excitation light may be produced by a semiconductor laser.

In the coherent Doppler lidar of the invention, as the excitation light, an excitation light may be excited by a semiconductor laser so as to have a wavelength of 750 nm to 820 nm in a wavelength band, and the excitation light may be input to only a region of the Tm, Ho:YAG ceramics disposed in the central part along the axial direction of the rod-shaped body.

According to the present invention, such an excellent advantage that a coherent Doppler lidar which can oscillate high-energy pulses, and output laser beams in a longer wavelength band region than 1.5 μm into the atmosphere can be provided.

When the coherent Doppler lidar according to the invention is loaded with an aircraft, a sudden phenomenon such as air turbulence in fair weather can be detected to prevent from occurring aircraft accidents.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

In the following, an example of an embodiment of a coherent Doppler lidar according to the invention will be described in detail by referring to the accompanying drawings.

Figure 1:
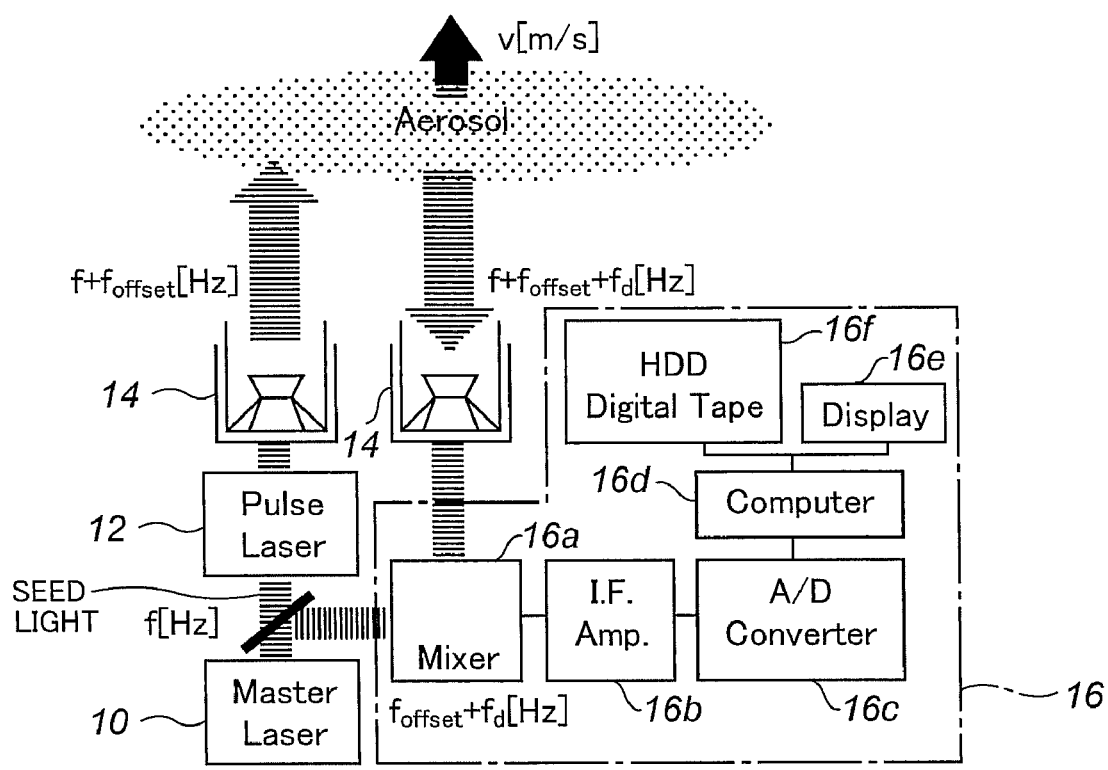
FIG. 1 is a constitutional explanatory block diagram showing a conventional coherent Doppler lidar.

In the following description, it is to be noted that the same or equal constitution as or to that of FIG. 1 is represented by the same reference characters as that used in FIG. 1, whereby the detailed explanation for the constitution and functions thereof are properly omitted.

Figure 2:
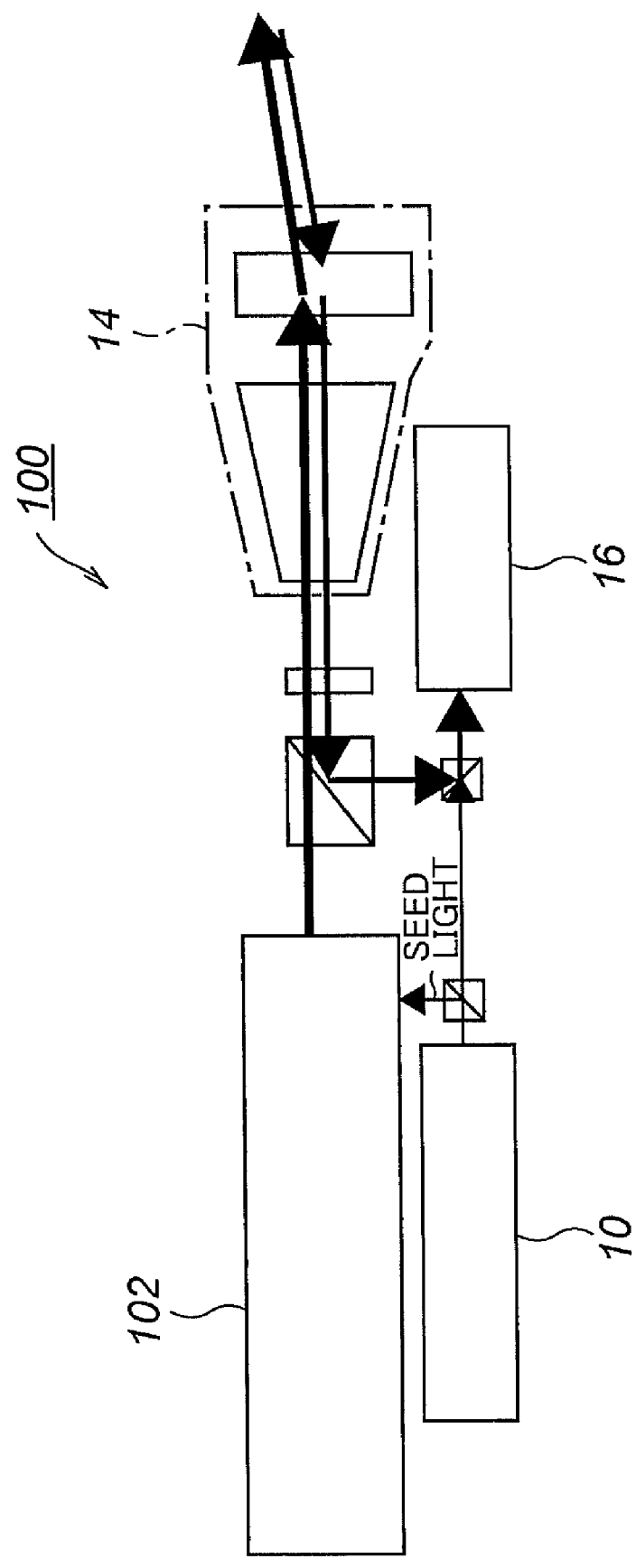
FIG. 2 is a constitutional explanatory block diagram showing a coherent Doppler lidar according to an example of an embodiment of the present invention.

First, FIG. 2 is a constitutional explanatory block diagram showing a coherent Doppler lidar according to an example of an embodiment of the present invention wherein the coherent Doppler lidar 100 differs from the conventional coherent Doppler lidar shown in FIG. 1 in only the point that the constitution of a pulse laser 102 differs from that of the conventional pulse laser 12 shown in FIG. 1.

Namely, the constitution excluding the pulse laser 102 in the coherent Doppler lidar 100 does not differ absolutely from that of the conventional coherent Doppler lidar 10.

Furthermore, operations of the coherent Doppler lidar 100 do not differ from that of the conventional coherent Doppler lidar including a treatment of pulse laser beams output from the pulse laser 102 other than operations of the production of pulse laser beams in the pulse laser 102.

Accordingly, detailed explanation will be made on the pulse laser 102 in the following description, but the other constitutions and the operations thereof are described by citing that of the conventional coherent Doppler lidar shown in FIG. 1, and the overlapped explanations therefor are omitted.

Figure 3:
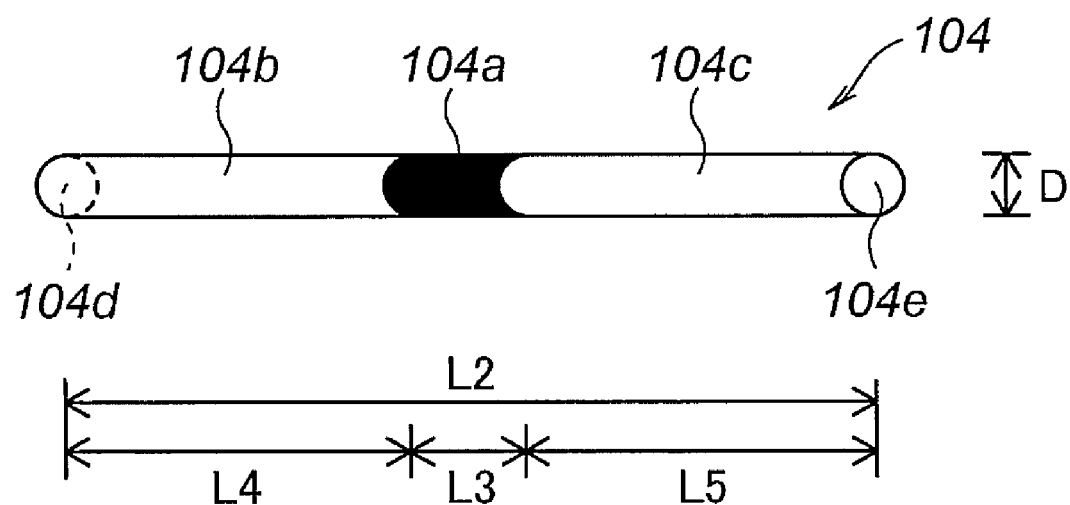
FIG. 3 is a perspective constitutional explanatory view showing a laser medium used for a pulse laser of the coherent Doppler lidar according to an example of an embodiment of the invention.

FIG. 3 is a perspective constitutional explanatory view showing a laser medium used for a pulse laser 102.

The laser medium 104 is a rod-shaped body made of YAG ceramics and the whole outline of which is in a columnar shape.

Compositions of the rod of YAG ceramics constituting the laser medium 104 differ from one another in a first region 104*a* positioned at the central part along the central axis direction (longitudinal direction) of the columnar shape as well as in a second region 104*b* and a third region 104*c* positioned on the opposite sides of the first region 104*a*.

Namely, the first region 104*a* is Tm, Ho:YAG ceramics which are YAG ceramics doped with at least either of Tm and Ho, while the second region 104*b* and the third region 104*c* are non-doped YAG ceramics which are doped with no ion.

A concentration of ions to be added in the case that Tm, Ho:YAG ceramics are fabricated as the first region 104*a* is made to be as follows with the proviso that Tm=0, and Ho=0 are excluded:

$0 \leq Tm \leq 20\%$, and preferably $3 \leq Tm \leq 6\%$ with respect to Tm;

$0 \leq Ho \leq 10\%$, and preferably $0.3 \leq Ho \leq 0.4\%$ with respect to Ho.

The laser medium 104 is composed of single YAG ceramics, but not the one prepared by adhesive-bonding the first, second, and third regions 104*a*, 104*b*, and 104*c* with each other.

In ceramics, a material obtained by joining a plurality of raw materials such as the laser medium 104 can be easily fabricated by means of no adhesive bond.

Figure 4:
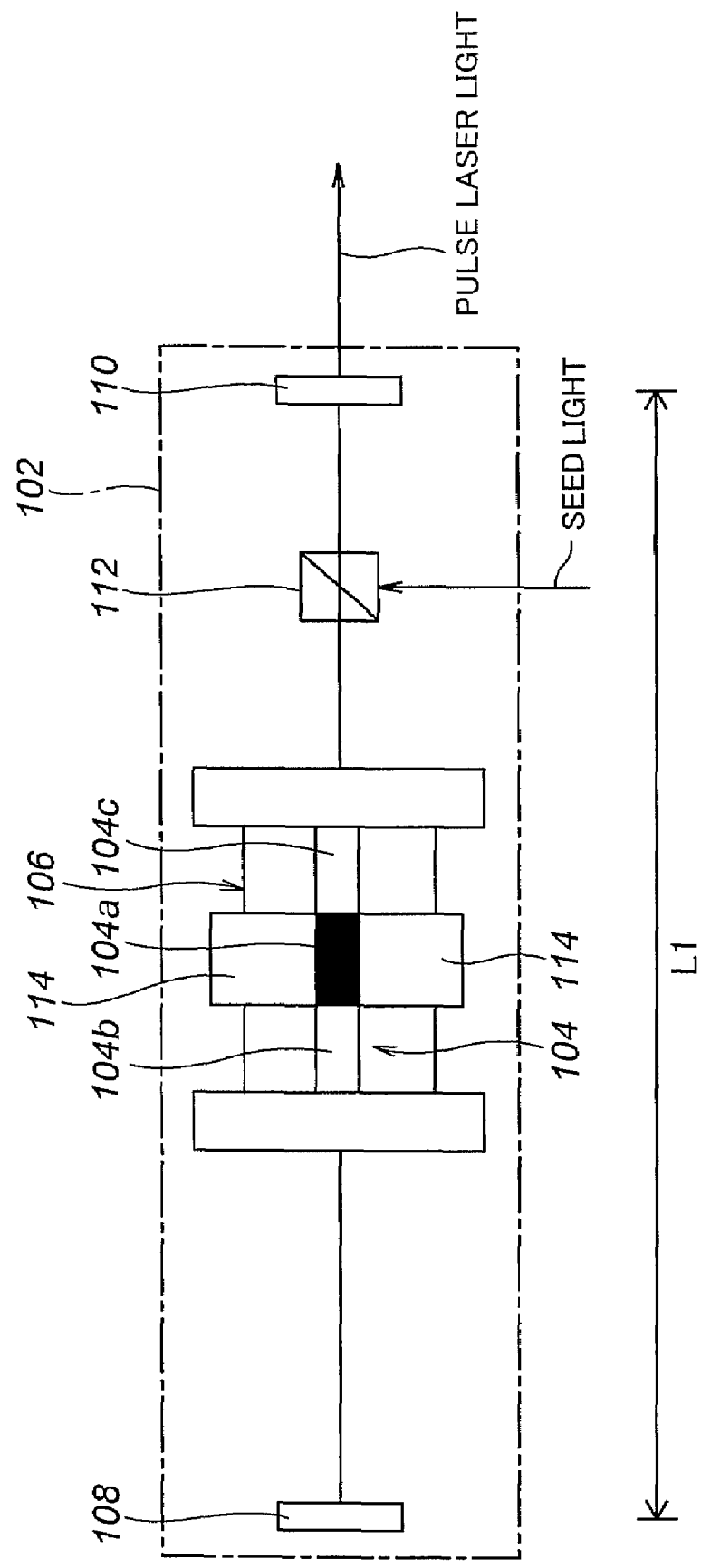
FIG. 4 is a conceptual, constitutional explanatory diagram showing the pulse laser in a coherent Doppler lidar according to an example of an embodiment of the invention.

FIG. 4 is a conceptual, constitutional explanatory diagram showing the pulse laser 102 provided with the above-described laser medium 104.

The pulse laser 102 is constituted from an excitation chamber 106 containing the laser medium 104 inside thereof, a rear mirror 108 and an output mirror 110 opposed to each other so as to sandwich the excitation chamber 106 in between them, and a light synthesizer 112 for injecting a seed light output from a master laser 10.

Namely, a linear type laser resonator is composed of the rear mirror 108 and the output mirror 110 in the pulse laser 102.

A high reflection mirror with respect to a light having a wavelength of from 1.9 μm to 2.2 μm is used for the rear mirror 108. On one hand, a partial reflection mirror is used for the output mirror 110 which transmits a part of a light having a wavelength of 1.9 μm to 2.2 μm to output laser beams having a wavelength of 1.9 μm to 2.2 μm outside the pulse laser 102.

The excitation chamber 106 is more fully described. In the excitation chamber 106, the laser medium 104 is disposed in such that an end 104*d* of the laser medium 104 is opposed to the rear mirror 108 (see FIG. 3), and the other end 104*e* of the laser medium 104 is opposed to the output mirror 110 (see FIG. 3).

The laser medium 104 is supported in the excitation chamber 106 by engaging the second region 104*b* and the third region 104*c* with the excitation chamber 106, and consequently, supported in the linear type laser resonator.

Around the laser medium 104 is surrounded by a flow tube (not shown), whereby the laser medium 104 is water-cooled to intend cooling of the laser medium 104.

Moreover, the excitation chamber 106 is provided with a semiconductor laser (laser diode) 114 irradiating laser beams as an excitation light in the diametrical direction of the laser medium 104, i.e. from a side of the laser medium 104 to the first region 104*a*. The semiconductor laser 114 is disposed so as to irradiate on only the first region 104*a*, and no laser beam is irradiated from the semiconductor laser 114 on the second and third regions 104*b* and 104*c*.

A semiconductor laser which can output laser beams in a wavelength band of a wavelength ranging from 750 nm to 820 nm is used for the semiconductor laser 114.

The laser medium 104 and the semiconductor laser 114 are cooled by means of a chiller (not shown) in the same system.

In the pulse laser 102 according to the constitution as described above, the first region 104*a* of Tm, Ho:YAG ceramics being a solid laser made of a polycrystalline substance wherein at least either of Tm and Ho is used as ions to be doped, i.e. the Tm, Ho:YAG ceramics being YAG ceramics doped with at least either of Tm and Ho is oscillated with Ho ions, while Tm ions function as a sensitizer which allows to absorb effectively an excitation light, whereby pulse laser beams of high energy in 2 μm wavelength band of a wavelength of 1.9 μm to 2.2 μm are oscillated due to excitation of an excitation light in a wavelength band of a wavelength of 750 nm to 820 nm irradiated from the semiconductor laser 114; and the oscillation wavelength is controlled by a seed light injected from a master laser through the light synthesizer 112.

In these circumstances, trivalent Tm and Ho function as active ions for laser oscillation in a wavelength band of 2 μm wavelength wherein laser beams are oscillated with Ho ions, and Tm acts as a sensitizer which allows an excitation light to be effectively absorbed.

It is to be noted that oscillation is made with Tm ions in the case that Ho=0%, while Tm becomes active ions in the case that Ho=0%. In this case, $^3H_4$ is a laser upper level in FIG. 5, and a distribution accumulated in this level transits to $^3H_6$ being in a lower level, whereby it results in oscillation in 1.9 μm to 2.1 μm band.

Figure 5:
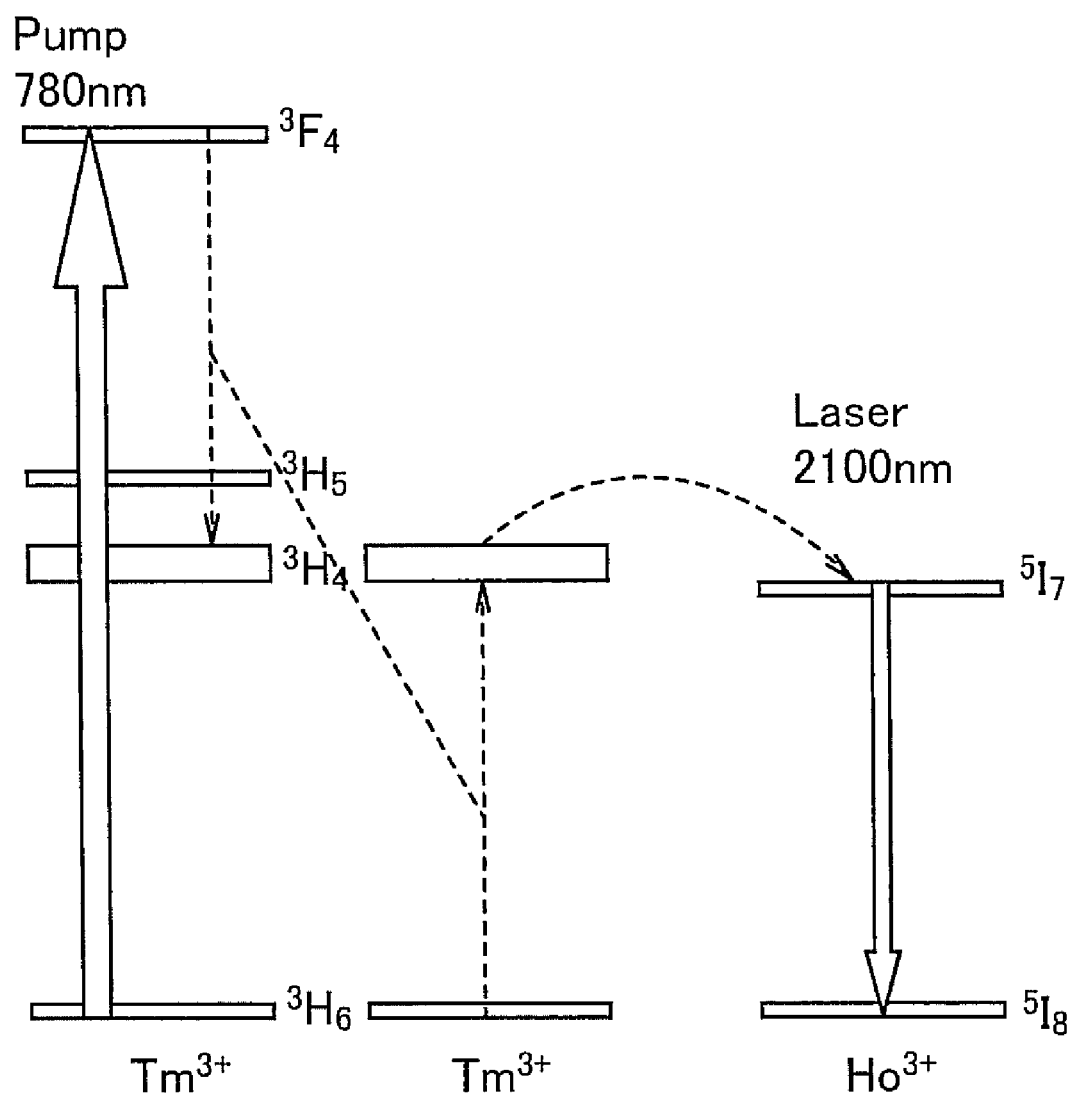
FIG. 5 is an energy level diagram of a Tm—Ho-based laser.

FIG. 5 is an energy level diagram of a Tm—Ho-based laser. In the pulse laser 102, Tm is excited by the use of the laser diode 108 which is adjusted to be matched with absorption of a $^3H_6$—$^3F_4$ transition in the vicinities of 780 nm of Tm as described above.

The distribution accumulated on $^3F_4$ transits to $^3H_4$, but cross-moderation arises in a certain probability; and at the same time, the adjacent Tm ions are excited from the ground level to $^3H_4$, so that the distribution is accumulated on $^3H_4$. Energy is transferred from the $^3H_4$ level of Tm to $^5I_7$ level of Ho, and the $^5I_7$ level is a laser upper level so that the transition to $^5I_8$ being in a lower level results in oscillation in the vicinities of 2.1 μm.

Although Ho may be directly excited by a 1.9 μm light, a semiconductor laser 114 outputting laser beams in a wavelength band of a wavelength of from 750 nm to 820 nm is used in the pulse laser 102 in order to apply an excitation wavelength in the vicinities of 780 nm of Tm from which a semiconductor laser of a low cost and a high power is available.

Next, experiments, wherein the above-described pulse laser 102 is used, conducted by the inventor(s) of this application will be described.

Dimensions of the pulse laser 102 used in the experiments are as follows.

Length L1 of laser resonator: 200 mm
Diameter D of laser medium 104: 3 mm
Whole length L2 of laser medium 104: 70 mm
Length L3 of first region 104a: 10 mm
Length L4 of second region 104b: 30 mm
Length L5 of third region 104c: 30 mm In addition, concentrations in addition (doping ratio) of Tm and Ho in Tm, Ho:YAG ceramics in the first region 104a are adjusted to be 6% Tm and 0.4% Ho.

Both the end faces 104d and 104e of the laser medium 104 are subjected to optical polishing and non-reflection coating in 2100 nm of laser grade, and the outer circumferential surface, i.e. the side of the first region 104a in the laser medium 104 is sandblasted.

Furthermore, the semiconductor laser 114 has 783 nm central wavelength and 3.5 nm line width, and the semiconductor laser 114 is driven by a power source implementing QCW operations of the 80 A maximum current peak and 0.5 ms pulse width. In this case, the maximum output energy of the semiconductor laser 114 is 900 mJ/pulse.

A high reflection mirror having a reflectance of 99.9% or higher with respect to a light having 2100 nm wavelength is used as the rear mirror 108.

On one hand, a partial reflection mirror having 95% reflectance with respect to a light having 2100 nm wavelength, and a partial reflection mirror having 90% reflectance with respect to a light having 2100 nm wavelength are prepared as the output mirror 110; and each of them is applied in every experiments.

Pulse energy of the laser beams output from the output mirror 110 of the laser medium 104 is measured by the use of Joule meter, and the oscillation wavelength is measured by the use of a compact spectrophotometer of a fiber-coupling type (Ocean Optics, NIR256-2.5).

Figure 6:
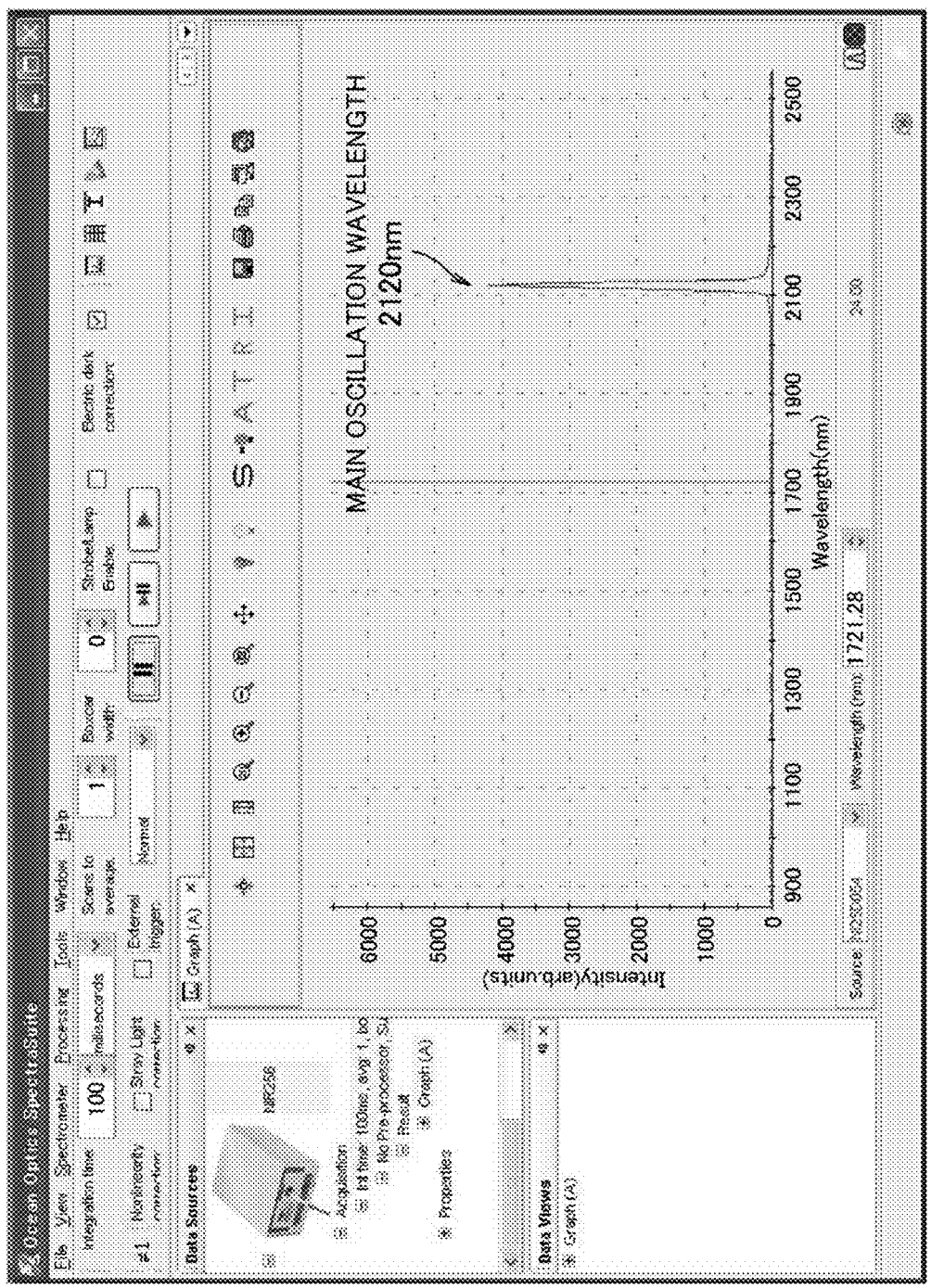
FIG. 6 is a diagram showing a spectrum of the laser beams output from a pulse laser in the case that a partial reflecting mirror having 95% reflectance with respect to a light of 2100 nm wavelength is used as an output mirror.
Figure 7:
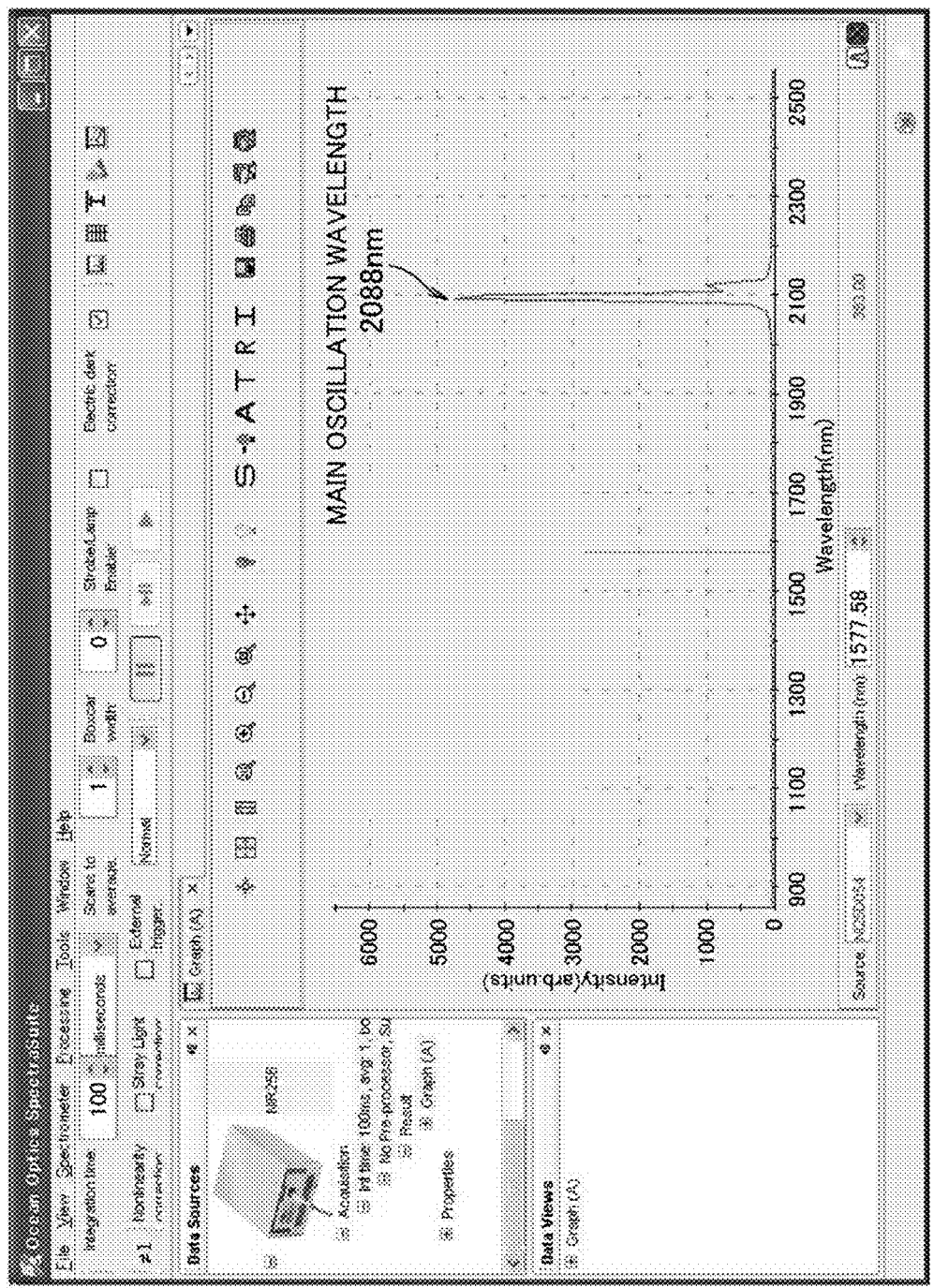
FIG. 7 is a diagram showing a spectrum of the laser beams output from a pulse laser in the case that a partial reflecting mirror having 90% reflectance with respect to a light of 2100 nm wavelength is used as an output mirror.

Experiments are conducted in a condition with no control in such that laser oscillation is effected at 20° C. water temperature in a flow tube. As a consequence, it is found that laser oscillation appears easily at 2120 nm main oscillation wavelength in the case that the partial reflection mirror having 95% reflectance with respect to a light having 2100 nm wavelength is used for the output mirror 110 (see FIG. 6), and that laser oscillation appears easily at 2088 nm main oscillation wavelength in the case that the partial reflection mirror having 90% reflectance with respect to a light having 2100 nm wavelength is used for the output mirror 110 (see FIG. 7).

Figure 8:
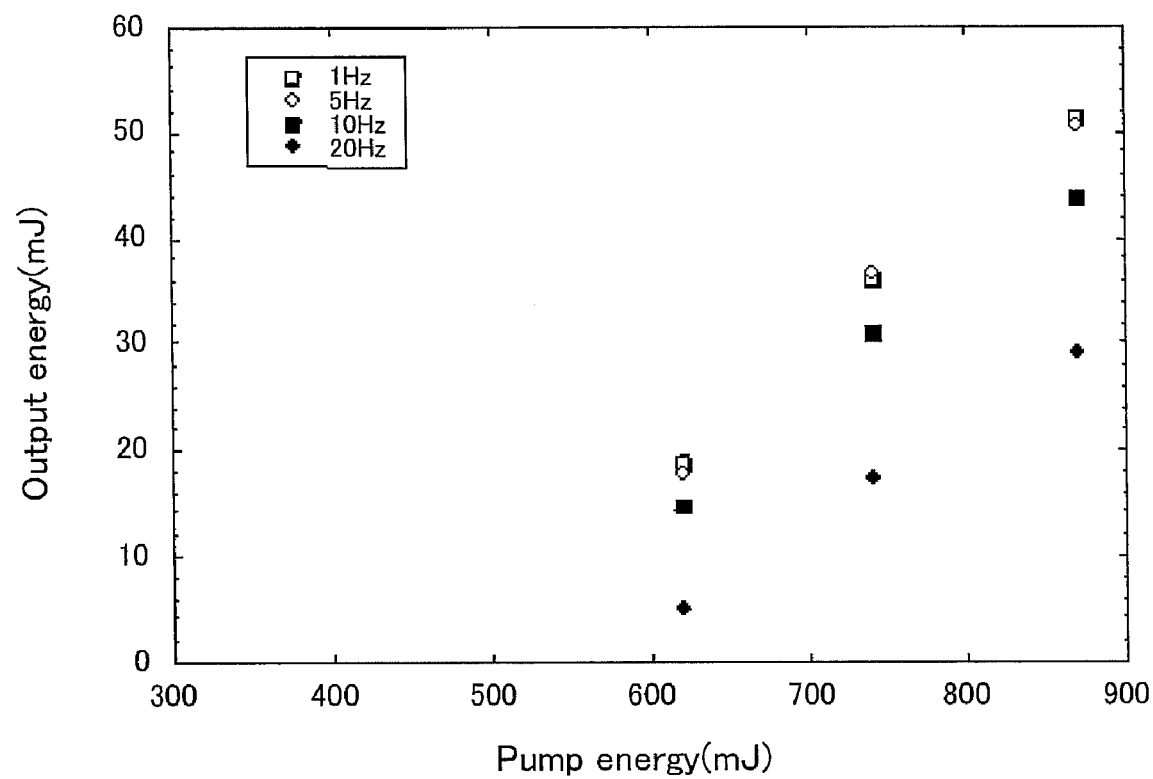
FIG. 8 is a graph showing a relationship of output energy with respect to excitation energy in a pulse laser in the case that a partial reflecting mirror having 95% reflectance with respect to a light of 2100 nm wavelength is used as an output mirror.

FIG. 8 is a graph showing a relationship of output energy with respect to excitation energy (pump energy) in the case that a partial reflection mirror having 95% reflectance with respect to a light of 2100 nm wavelength is used as the output mirror 110.

Figure 9:
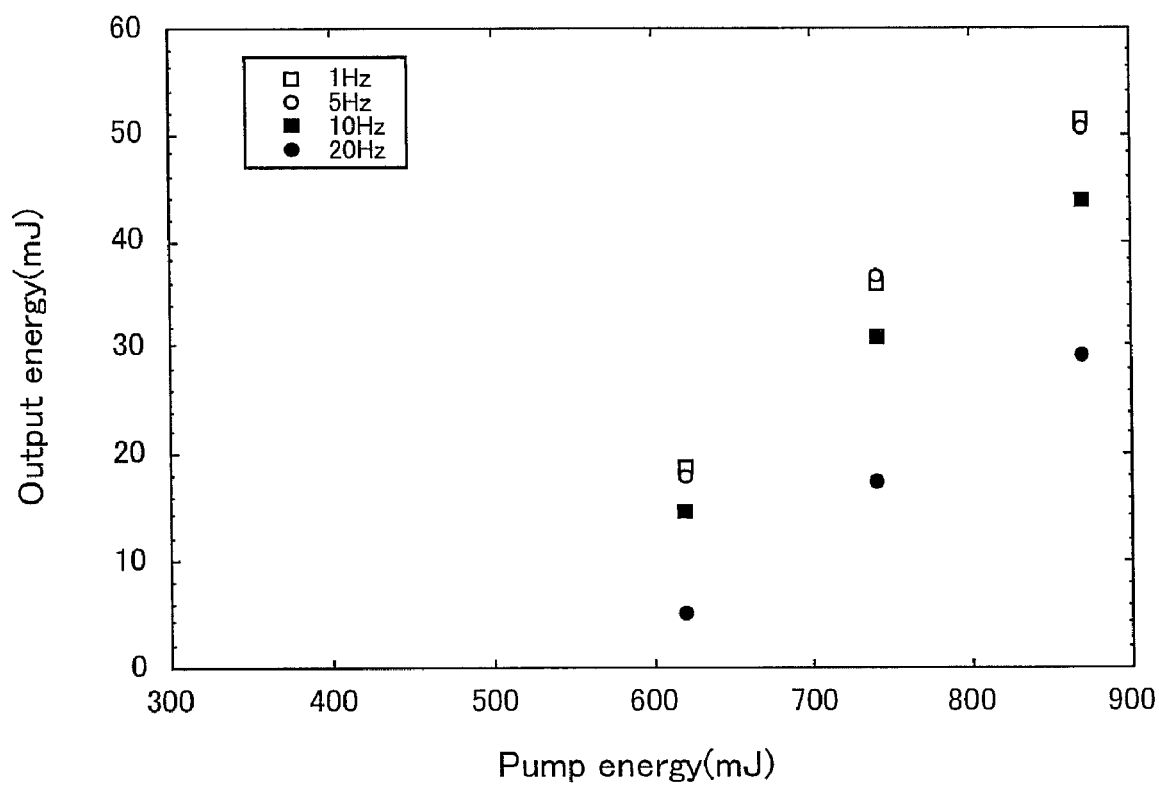
FIG. 9 is a graph showing a relationship of output energy with respect to excitation energy in a pulse laser in the case that a partial reflecting mirror having 90% reflectance with respect to a light of 2100 nm wavelength is used as an output mirror.

Moreover, FIG. 9 is a graph showing a relationship of output energy with respect to excitation energy in the case that a partial reflection mirror having 90% reflectance with respect to a light of 2100 nm wavelength is used as the output mirror 110.

In FIGS. 8 and 9, symbol □ indicates results in repetition frequency 1 Hz, ○ indicates results in repetition frequency 5 Hz, ■ indicates results in repetition frequency 10 Hz, and ● indicates results in repetition frequency 20 Hz, respectively.

As shown in these FIGS. 8 and 9, the higher repetition frequency results in the lower output energy per pulse.

With respect to the same repetition frequencies, higher output energy is obtained in the case that the partial reflection mirror having 95% reflectance with respect to a light of 2100 nm wavelength is used for the output mirror 110 than that the partial reflection mirror having 90% reflectance with respect to a light of 2100 nm wavelength is used for the output mirror 110.

However, even if the partial reflection mirror having 90% reflectance with respect to a light of 2100 nm wavelength is used for the output mirror 110, output energy 41 mJ is obtained in 1 Hz, while output energy 30 mJ is obtained in 10 Hz at the maximum excitation energy 860 mJ.

Furthermore, experiments are conducted by changing a water temperature, so that the output energy increases in the case that the water temperature is reduced.

Figure 10:
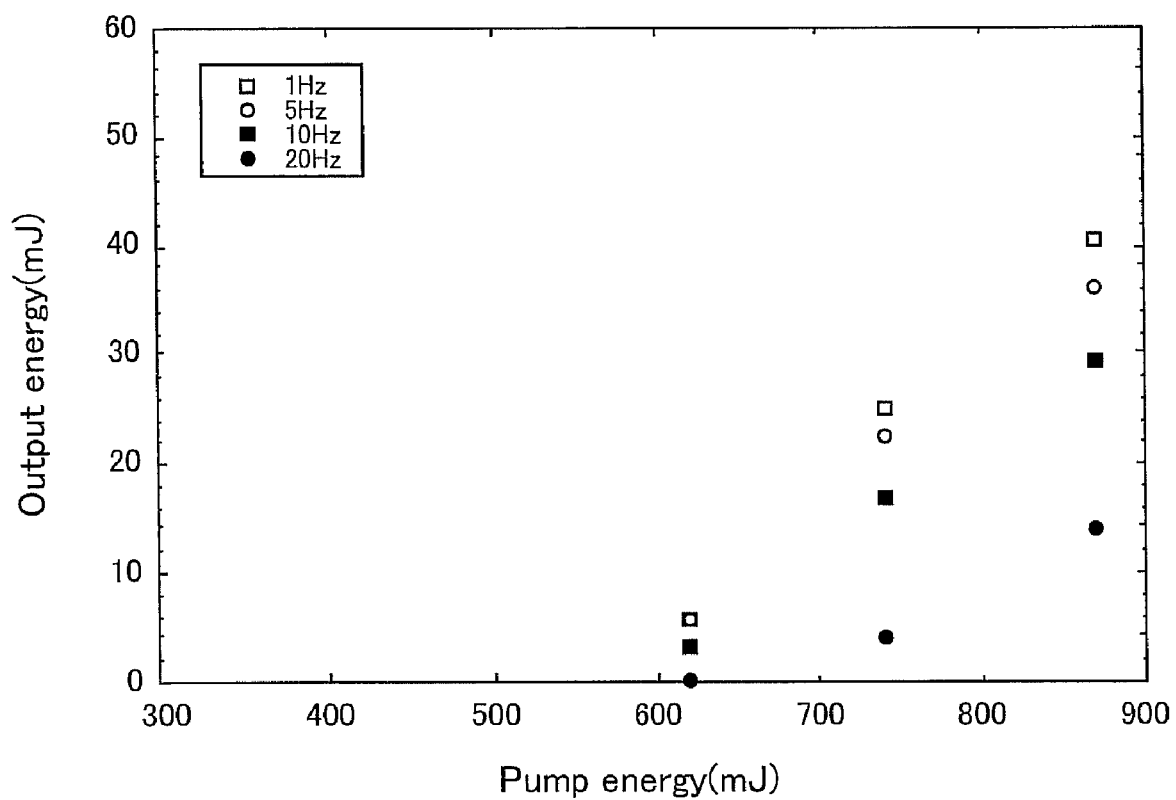
FIG. 10 is a graph showing the maximum output energy obtained with respect to respective cooling water temperatures in the case that a temperature of cooling water is changed.

FIG. 10 is a graph showing experimental results in such an experiment that a water temperature (a cooling water temperature) is changed. In the experiments, only a partial reflection mirror having 90% reflectance with respect to a light of 2100 nm wavelength is used for the output mirror 110.

In FIG. 10, a symbol ■ indicates the results in repetition frequency 1 Hz, and □ indicates the results in repetition frequency 10 Hz. In this case, excitation energy is 860 mJ/pulse.

In the condition wherein a water temperature is reduced up to 16° C., output energy of 48 mJ in repetition frequency 1 Hz is obtained, and output energy of 43 mJ is also obtained in repetition frequency 10 Hz.

Namely, output energy of the maximum 48 mJ or more is obtained in 860 mJ excitation by means of the semiconductor laser 114, and a cooling water temperature of 16° C.

Light-light conversion efficiency at that time reaches 5% or more, and this result indicates that an effective absorption power of the semiconductor laser 114 does not depend remarkably upon the shift of a central wavelength of the semiconductor laser 114 in the vicinities of 783 nm.

In the case that excitation is made by a semiconductor laser, the excitation efficiency of laser medium is far higher than that of lamp excitation, so that a problem is in that the local heat generation is removed by a what kind of manner.

Since the laser medium 104 in the pulse laser 102 is made of YAG ceramics, the first region 104a of Tm, Ho:YAG ceramics are joined to the second and third regions 104b and 104c of non-doped YAG ceramics to which no Tm and Ho is added without accompanying adhesive-bonding, so that the second and third regions 104b and 104c are allowed to function as a heat sink to dissipate heat.

In case of quasi-3-level laser systems such as Tm, Ho-based 2 μm band oscillation, there is further such function that the second and third regions 104b and 104c, being a site to which no semiconductor laser 114 can be provided so that no excitation light can input are not doped in order that an ion addition region is disposed on only a part (the first region 104a) generating a gain by inputting an excitation light, and it is attached to the excitation chamber 106, whereby reabsorption loss which becomes a problem in quasi-3-level systems is avoided so that it contributes to more efficient oscillation; in addition to such function that the second and third regions 104b and 104c act as the above-described heat sink.

As described above, when Tm, Ho:YAG ceramics being the first region of the laser medium 104 is excited by the semiconductor laser 114 which QCW-oscillates in the pulse laser 102, the laser oscillation can be obtained in a wavelength band of 2 μm wavelength. Accordingly, a coherent Doppler lidar provided with the pulse laser 102 can oscillate high energy pulse oscillation, and it is possible to output laser beams in a longer wavelength region than 1.5 μm to the atmosphere.

Figure 11A:
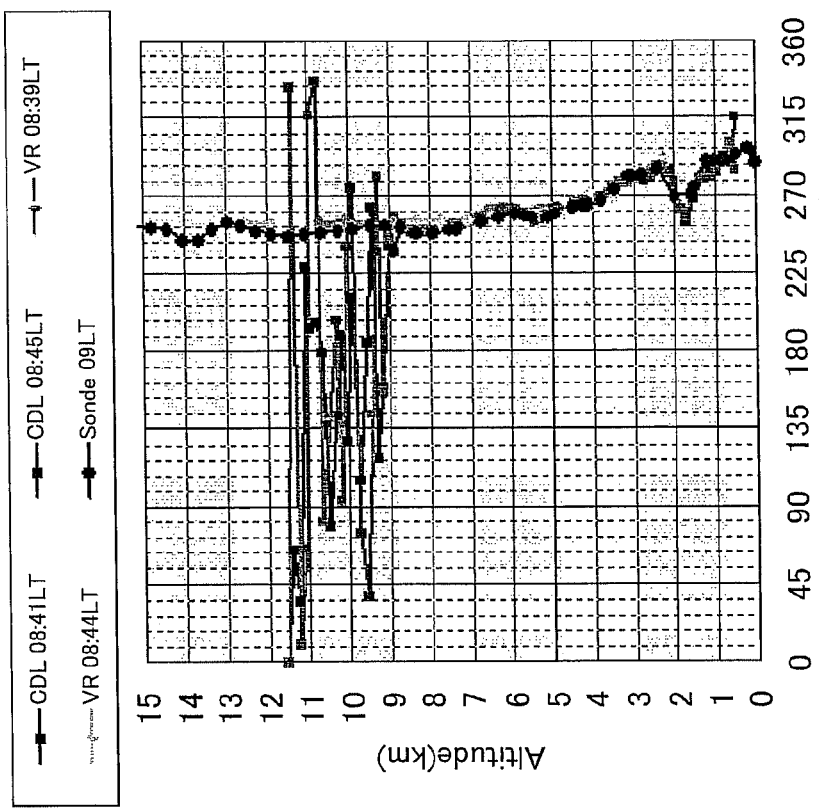
FIGS. 11(a) and 11(b) are graphs showing experimental results which are very similar to those expected in the case that a coherent Doppler lidar according to the invention is used.
Figure 11B:
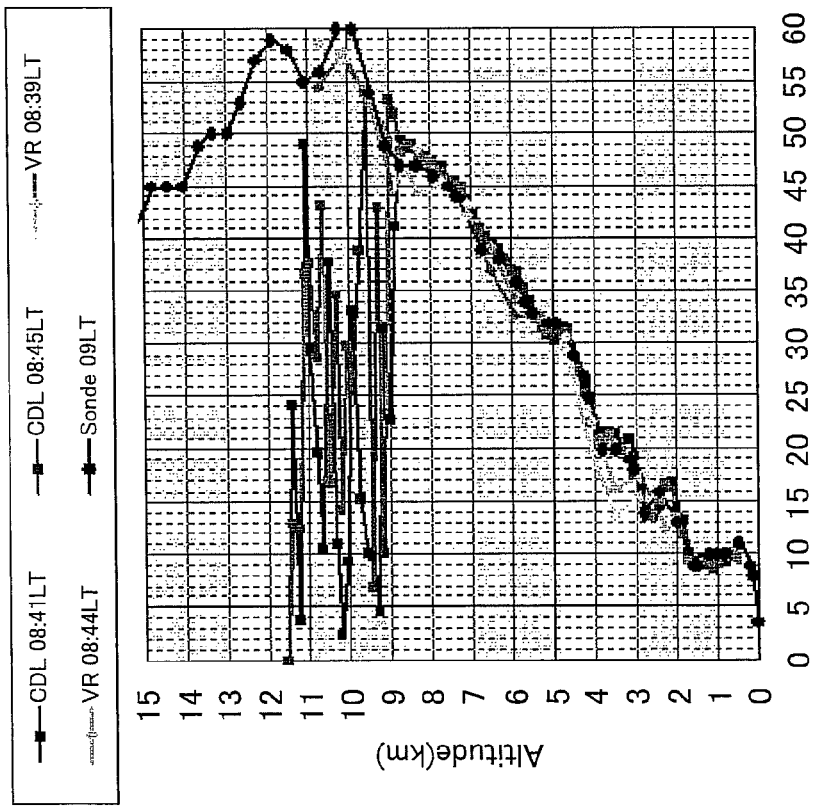
Figure 12:
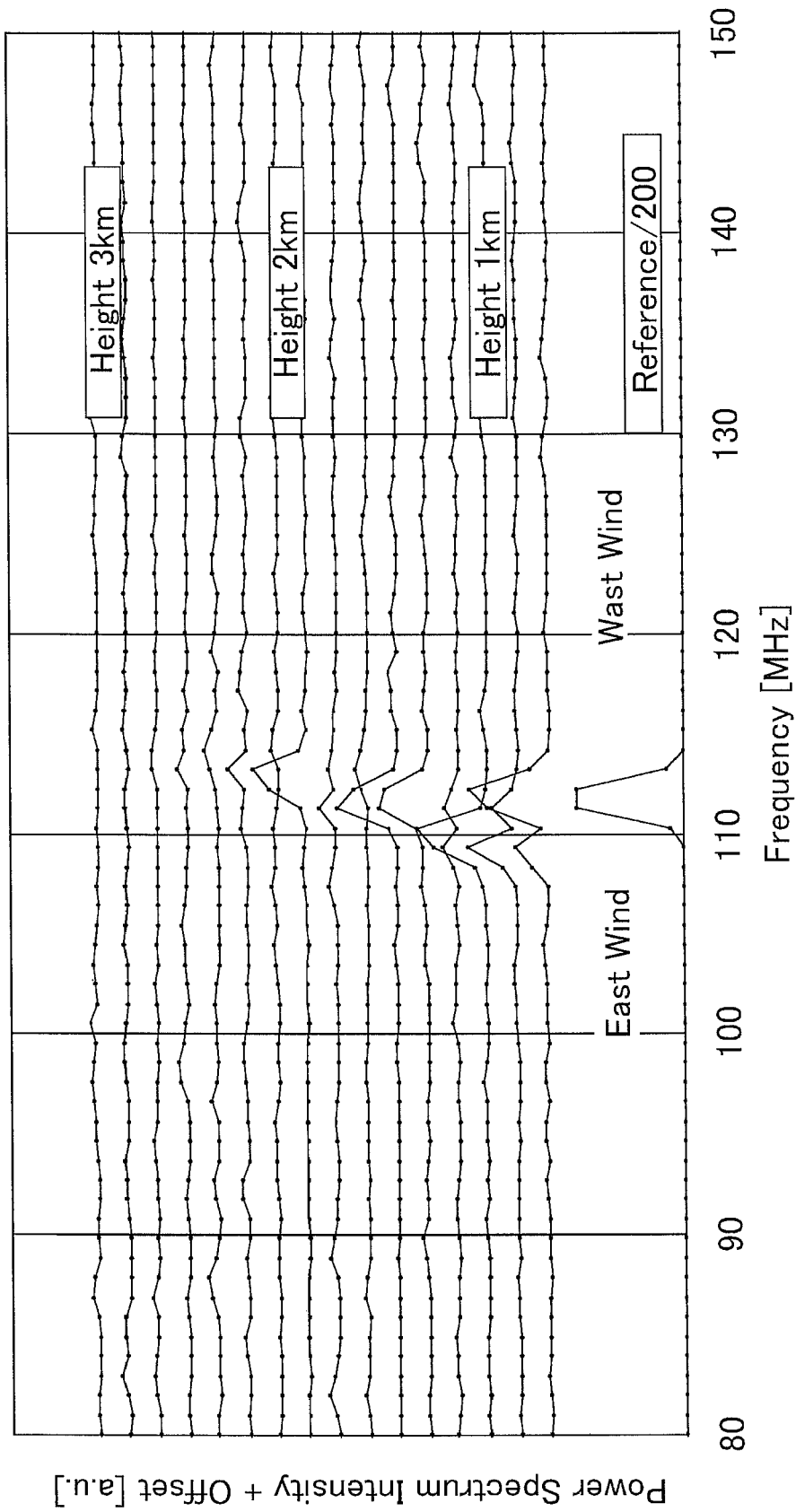
FIG. 12 is a graph showing experimental results which are very similar to those expected in the case that a coherent Doppler lidar according to the invention is used.

FIGS. 11(a) and 11(b) as well as FIG. 12 are graphs showing experimental results which are very similar to those expected in the case that the coherent Doppler lidar 100 provided with the pulse laser 102 used in the above-described experiments (wherein a partial reflection mirror having 95% reflectance with respect to a light having 2100 nm wavelength is used as the output mirror 110) is used.

Namely, the graphs shown in FIGS. 11(a) and 11(b) indicate wind velocities (FIG. 11(a)) and wind directions (FIG. 11(b)) with respect to heights measured by the use of a conventional Doppler lidar to show the expected results in the case of the use of the coherent Doppler lidar 100 provided with the above-described pulse laser 102 (represented by "CDL" in FIGS. 11(a) and 11(b), and the prior art VHF as well as the prior art sonde.

Referring to FIGS. 11(a) and 11(b), both the respective data of wind velocities and wind directions coincide with each other at very high accuracy measured by CDL, VHF, and sonde so far as the height is up to 9 km.

Although high accurate data can be obtained by means of the sonde according to the prior art because of the measurement on site, it is required to let a measuring device fly into the air so that it is used once and then throw it away, and consequently, the cost for measuring once to collect data is very expensive.

On the other hand, CDL can be installed on the ground, so that it is possible to measure wind data at a low cost and high precision.

Moreover, in the graph shown in FIG. 12, the designation "Reference" shown in the last line indicates a spectrum of the pulse laser beams output from the coherent Doppler lidar 100, while a plurality of spectra over the designation "Reference" indicates frequencies of light pulses returned due to such operation that the pulse laser beams output from the coherent Doppler lidar are reflected in the midair. Dependent on wind directions, signals wherein a frequency is shifted by an amount in response to respective wind velocities to a low frequency side in case of east wind or a high frequency side in case of west wind are observed.

The above-described embodiments may be modified as described in the following paragraphs (1) through (4).

(1) Although results of the experiments wherein the semiconductor laser 114 having 783 nm central wavelength is used in the case that the laser medium 104 is excited are shown in the above-described embodiments, the excitation wavelength of the laser medium 104 is not limited thereto as a matter of course, but a wavelength band of 750 nm to 820 nm, and preferably a wavelength band of 780 nm to 790 nm may be used.

(2) Although results of the experiments wherein addition concentrations of Tm and Ho of Tm, Ho:YAG ceramics in the first region 104a are made to be 6% in case of Tm, and 0.4% in case of Ho are shown in the above-described embodiments, the addition concentrations of Tm and Ho are not limited thereto as a matter of course, but, for example, Tm may be 3%, and Ho may be 0.3%, namely, the addition concentrations of Tm and Ho may be selected arbitrarily within the following ranges:

$0 \leq Tm \leq 20\%$, and $0 \leq Ho \leq 10\%$.

(3) Although dimensions of the pulse laser 102 and the laser medium 104 are described by specific numerical values in the above-described embodiments, these numerical values relate merely to a certain example, but the dimensions of the pulse laser 102 and the laser medium 104 are not limited thereto, but they may be arbitrary dimensions in response to conditions of a design.

(4) Although the whole appearance of the laser medium 104 is a rod-shaped body having a columnar contour in the above-described embodiments, the contour of the laser medium 104 is not limited thereto, but it may be constituted into an appropriate contour in response to conditions of the design.

(5) The above-described embodiments may be appropriately combined with the modifications described in the above paragraphs (1) through (4).

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

The entire disclosure of Japanese Patent Application No. 2006-309274 filed on Nov. 15, 2006 including specification, claims, drawings and summary are incorporated herein by reference in its entirety.

What is claimed is:

1. A coherent Doppler lidar, comprising:
a pulse laser an oscillation wavelength of which is controlled by means of injection locking of a seed light output from a master laser;
pulse laser beams output from the pulse laser being injected to the atmosphere; and
the pulse laser beams receiving a reflected light being the pulse laser beams injected to the atmosphere which are subjected to Doppler shift to detect the Doppler shift based on the reflected light received;
wherein the pulse laser is a type in which a laser medium is disposed in a resonator, a pulse light of a predetermined repetition frequency is input to the laser medium as an excitation light, whereby pulse laser oscillation is generated in the resonator to output pulse laser beams from the resonator;
the laser medium being a type which has a garnet structure and at least a region having Tm, Ho:YAG ceramics being a material which is prepared by adding at least either of Tm (thulium) and Ho (holmium) as laser active ions to clear YAG (yttrium, aluminum, and garnet) ceramics represented by a chemical formula $Y_3Al_5O_{12}$;
the laser medium being excited by the excitation light to output pulse laser beams in a band of a wavelength of 1.9 μm to 2.2 μm; and further,
the YAG ceramics are a solid laser made from a polycrystalline substance obtained by aggregating single crystals a size of which is 1 mm or less and;
a cooling means for cooling the laser medium is provided.

2. The coherent Doppler lidar as claimed in claim 1, wherein:
an addition concentration of Tm and Ho to be added to the YAG ceramics is:
$0 \leq Tm \leq 20\%$ and $0 \leq Ho \leq 10\%$.

3. The coherent Doppler lidar as claimed in claim 1, wherein:
the laser medium is in a rod-shaped body in which a region of the Tm, Ho:YAG ceramics is disposed in the central part along the axial direction of the rod-shaped body, and regions of the YAG ceramics to which no laser active ion is added are disposed in the opposite sides of the central part of the rod-shaped body.

4. The coherent Doppler lidar as claimed in claim 3, wherein:
the excitation light is produced by a semiconductor laser.

5. The coherent Doppler lidar as claimed in claim 3, wherein:
as the excitation light, an excitation light is excited by a semiconductor laser so as to have a wavelength of 750 nm to 820 nm in a wavelength band, and the excitation light is input to only a region of the Tm, Ho:YAG ceramics disposed in the central part along the axial direction of the rod-shaped body.

6. The coherent Doppler lidar as claimed in claim 1, wherein:
a wavelength band of the excitation light is that of a wavelength of 750 nm to 820 nm.

7. The coherent Doppler lidar as claimed in claim 6, wherein:
the excitation light is produced by a semiconductor laser.

8. The coherent Doppler lidar as claimed in claim 3, wherein:
a wavelength band of the excitation light is that of a wavelength of 750 nm to 820 nm.

9. The coherent Doppler lidar as claimed in claim 8, wherein:
the excitation light is produced by a semiconductor laser.

10. The coherent Doppler lidar as claimed in claim 1, wherein:
the excitation light is produced by a semiconductor laser.

* * * * *